United States Patent [19]

Mauron

[11] 3,756,094

[45] Sept. 4, 1973

[54] DEVICE FOR INTERLOCKING TWO ELEMENTS WHICH ARE RELATIVELY SLIDABLE

[75] Inventor: Gerard Mauron, Versailles, France

[73] Assignees: Automobiles Peugeot, Paris; Regie Nationale Des Usines Renault, Billancourt, France

[22] Filed: Nov. 2, 1971

[21] Appl. No.: 194,844

[30] Foreign Application Priority Data

Nov. 18, 1970 France .............................. 7041413

[52] U.S. Cl. .................... 74/527, 248/429, 308/3.6
[51] Int. Cl. ........................................... F16m 13/00
[58] Field of Search ............................ 74/527, 529; 308/3.6; 312/348; 248/429

[56] References Cited
UNITED STATES PATENTS
3,627,253  12/1971  Germain ............................... 74/527
1,969,353  8/1934  Chapman ........................... 248/429
3,445,143  5/1969  Swenson .......................... 308/3.6 X

*Primary Examiner*—Allan D. Herrmann
*Attorney*—Robert S. Swecker

[57] ABSTRACT

Device for interlocking two relatively slidable elements one of which carries a rack having a slideway and the other slide means movable along the slideway. Two locking means on the slide means are movable between a locking position in which they are engaged in recesses of the rack and an unlocking position on which the locking means are withdrawn from the recesses. A cam associated with the locking means is movable on the slide means for withdrawing the locking means or maintaining the locking means engaged with the recesses. Spring means bias the cam to the position for maintaining the locking means in the recesses and a control means brings the cam to the locking means-withdrawing position. The device is substantially symmetrical relative to a plane which is parallel to the longitudinal direction of the slideway and perpendicular to the guide face of the slideway.

16 Claims, 10 Drawing Figures

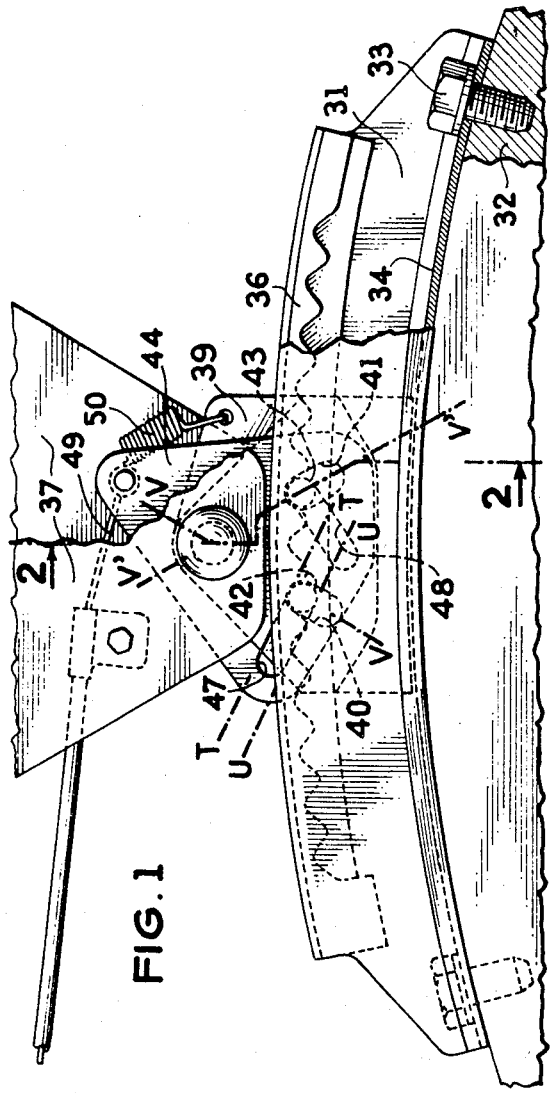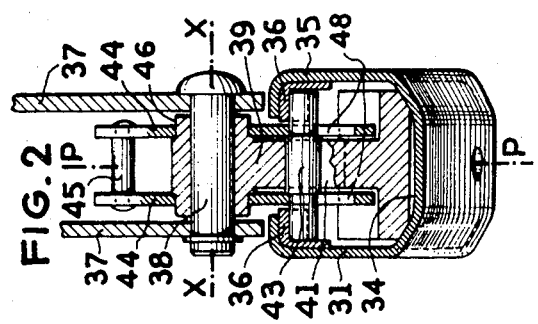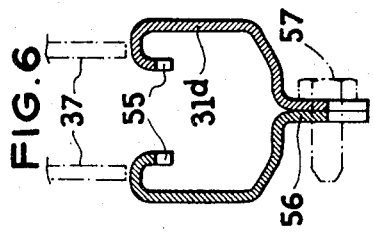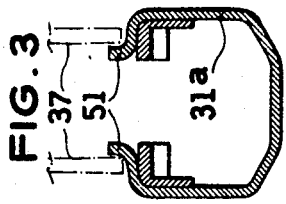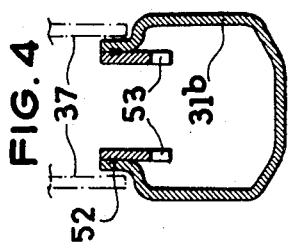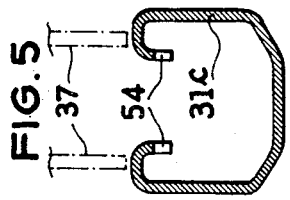

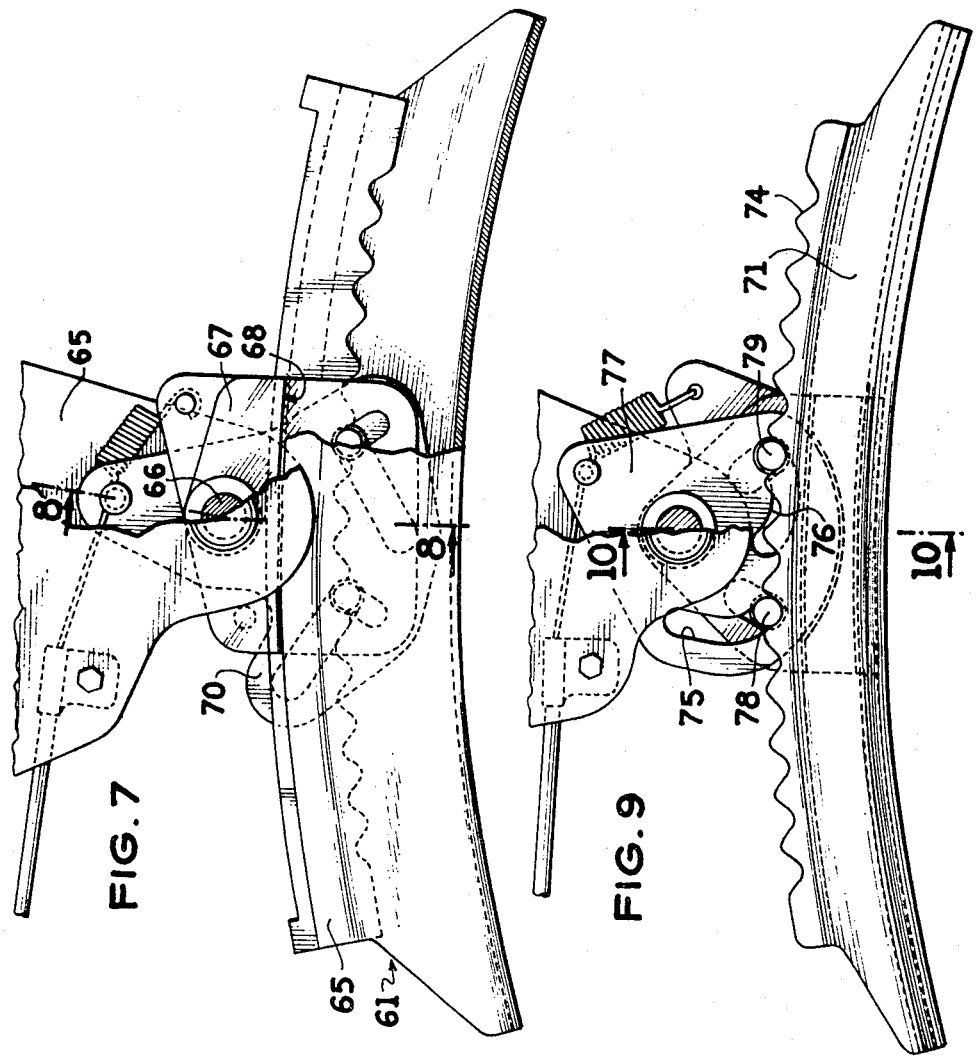

DEVICE FOR INTERLOCKING TWO ELEMENTS WHICH ARE RELATIVELY SLIDABLE

The present invention relates to devices for interlocking two elements which are relatively slidable in a rectilinear or curvilinear path, such devices being in particular of utility for the mounting of longitudinally adjustable seats of automobile vehicles.

There has already been described such a device in U.S. Pat. application Ser. No. 44,784, now U.S. Pat. No. 3,627,253 the main advantages of which are an efficiency which is unaffected by the wear of the component parts and full safety in both directions of relative displacement owing to the absence of any reaction which would tend to result in an unlocking.

The device disclosed in the aforementioned Patent Application is of the type having a rack integral with one of the elements and associated locking means carried by the other element and comprising in combination a slideway integral with the rack; slide means integral with the other element and movable along the slideway; two locking means carried by and movable on the slide means between a locking position in which they are engaged in two recesses in the rack and an unlocking position in which they are withdrawn from the recesses; a cam movable on the slide means between a first position in which the locking means are withdrawn and a second position in which the cam maintains them engaged in the recesses; resiliently yieldable means for returning the cam to its second position and a control device for bringing the cam to its first position in opposition to the action of the resiliently yieldable means.

The present invention concerns an improvement in the device just defined which is described in more detail in said patent application so as to improve its resistance to tearing away and enable it to withstand the considerable forces to which a vehicle seat is subjected in particular in the event of an accident when the safety belt exerts considerable tension and/or the seat undergoes a thrust under the impact of the passenger located behind the seat or under the pressure of an inflatable bag incorporated in the backrest of the seat.

These results are attained in a locking device such as defined hereinbefore which is symmetrical with respect to a plane parallel to the longitudinal direction of the slideway and perpendicular to the guide face of said slideway.

According to another feature, the slideway has a substantially U- or C-shaped cross section of which the opening is upwardly directed and the two flanges define or carry a rack which extends roughly parallel to the slideway. With this symmetrical arrangement, there is an improved distribution of the forces which affords the desired result.

According to another feature of the invention, the locking means comprise two pairs of fingers which are carried by and movable on the slide means, and are received in guide apertures in the cam.

Further features and advantages of the invention will be apparent from the ensuing description with reference to the accompanying drawings.

In the drawings :

FIG. 1 is a side elevational view, with a part cut away, of a first embodiment of the device according to the invention;

FIG. 2 is a cross-sectional view taken on line 2—2 of FIG. 1;

FIGS. 3–6 are detail cross-sectional views of various embodiments of the slideway;

FIG. 7 is a side elevational view, with a part cut away, of another embodiment of the device according to the invention;

FIG. 8 is a cross-sectional view taken on line 8—8 of FIG. 7;

FIG. 9 is a view similar to FIG. 7 of another embodiment of the devices according to the invention, and FIG. 10 is a cross-sectional view taken on line 10—10 of FIG. 9.

A first embodiment of the device according to the invention will first be described with reference to FIGS. 1 and 2. FIG 1 shows a slideway 31 fixed to the floor 32 of a vehicle by means of bolts 33. This slideway, which is better seen in FIG. 2, has a C-shaped cross section defined by a transverse bottom wall 34 and upstanding branches 35 having curved end portions fixed to two racks 36. Thus the slideway 31 and the two racks 36 constitute a rigid unit. The top face of the wall 34 constitutes guide face means. A fork having two branches carrying the reference character 37 is integral with the frame of the seat and these two branches are interconnected in their lower part by a pin 38 having a horizontal axis X—X. A slide block or shoe 39 is mounted on this pin and has a lower part which bears on the guide face means or bottom wall 34 of the slideway. Apertures 40 and 41 the arrangement of which can be seen in FIG. 1 are formed in the block 39. Slidably mounted in these apertures are fingers 42 and 43 which extend on each side of the block so as to cooperate with the racks 36.

The mechanism for actuating this device comprises a cam constituted by two identical side walls or outer portions 44 which are interconnected in their upper part by a spacer element 45 and pivotably mounted on bearing portions 46 of the block 39. The pivot axis of the cam 44 coincides with the axis X—X. Each side wall of this cam is provided with two apertures 47 and 48 in which the fingers 43 are guided. In its upper part, the cam is connected to an actuating cable 49 and is biased by a return spring 50 which tends to maintain the cam in the position in which the fingers 42 and 43 are engaged in the racks 36.

In such a device, the locking is ensured under the same conditions as in that of the aforementioned Patent Application. In this locking position, the planes (T—T, U—U) tangent to the contact points between the fingers and the racks on one hand and between the cam and the fingers, on the other, are parallel to each other and perpendicular to the plane V—V containing the axes of the fingers and the pivot axis of the cam 44. This avoids any reaction in one direction or the other which would tend to result in the unlocking. It will be understood that the same arrangement is provided for each pair of fingers. To unlock the device, it is sufficient to pull on the cable 49 which pivots the cam 44 about the axis X—X in opposition to the action of the spring 50, the fingers 42, 43 being then urged downwardly by the upper faces of the apertures 47 and 48 and thus disengaged from the recesses between the teeth of the racks 36. Once this unlocking has been achieved, the seat can be displaced longitudinally with respect to the slideways 31, the slide block 39 bearing against and sliding along the bottom wall 34 of the corresponding slideway.

In addition to the advantages already explained in the aforementioned Patent Application, this arrangement, which is symmetrical with respect to a vertical plane P—P, has a substantially increased strength which enables it to withstand the very large upwardly-exerted tensile forces which occur in the event of the vehicle being subjected to a sudden shock, with no danger of the seat becoming separated from its support which is fixed to the floor of the vehicle. This feature considerably improves the safety for the occupant of the seat.

It will also be observed that the resiliently yieldable means which were necessary in the aforementioned Patent Application for disengaging the locking means from the rack have been dispensed with, this function being performed directly by the side walls of the apertures 47, 48.

In the modification shown in FIG. 3, the slideway 31 also has a C-shaped section but includes two raised edge portions 51 which are engaged between the branches 37 of the fork. The behaviour of the assembly is thus improved since the branches of the fork constitute a positive retaining means for the branches of the slideway the opening of which is thus rendered impossible.

FIG. 4 shows vertical raised edge portions 52 similar to those shown in FIG. 3 but in this arrangement the racks are formed in strips 53 welded to these raised edge portions 52 of the slideway 31b.

In FIG. 5, the branches of the slideway 31c terminate at their ends in inwardly- and downwardly-folded edge portions 54 in which the racks are directly machined.

In FIG. 6, the arrangement of the racks 55 is similar to that shown in FIG. 5 except that the slideway 31d is constituted by two elements which are fixed in their lower parts along the flanges 56 by welding or by means of bolts 57 which also enable the two elements to be fixed to the floor.

In another embodiment shown in FIGS. 7 and 8, there are the same essential component parts but their forms and arrangements are slightly different. The slideway 61 is similar to that shown in FIG. 4, that is to say, it has two branches 62 terminating in vertical edge portions 63 welded to strips 64 which are cut along their lower edge so as to form a rack the slideway 61 and the two racks 64 constituting a rigid unit. The two branches of the fork 65 are, as previously, spaced apart by a pin 66 on which a slide block 67 is pivotably mounted. However, in contradistinction to the previous arrangement, this slide block does not bear against the bottom of the slideway but on its edge portions 63 by two bearing faces 68, the portions 63 defining guide face means. Further, the slide block 67 itself forms a fork between the branches or outer portions 69 of which the cam 70 is received. There is the previously described arrangement of the fingers and guide apertures, the actuating cable device and the return spring. This device operates in every way in a manner similar to that described with respect to the embodiment shown in FIGS. 1 and 2.

In all the foregoing embodiments, the rack teeth and recesses face downwardly. It will be understood that it is possible to construct a device in which the rack teeth and recesses face upwardly as shown in FIGS. 9 and 10. In this case, the slideway 71 has a slightly widened cross-sectional shape (FIG. 10) so as to form two substantially horizontal retaining faces 72 which cooperate with corresponding faces 73a on the slide block 73 so as to offer a resistance to tearing-away forces. The racks are directly machined in the vertical edge portion 74 of the branches of the slideway. The other component parts of the device have no particular feature except that the apertures 75 and 76 in the two side walls or outer portions 77 of the cam have curved shapes so as to ensure the correct disengagement of the locking fingers 78 and 79.

The same advantages are obtained as in the previously-described arrangements.

Having now described our invention what We claim and desire to secure by Letters Patent is :

1. In a device for interlocking relatively movable first and second structures, comprising in combination, rack means and a slideway combined into a single unit which extends longitudinally in a plane and is integral with said first structure, the rack means defining rack recesses and the unit defining guide face means, a slide integral with said second structure and movable along the slideway in slidable engagement with the guide face means, two locking means mounted on the slide to move between a locking position in which the locking means are engaged in rack recesses in the rack means and an unlocking position in which the locking means are withdrawn from the rack recesses, a cam associated with the locking means and mounted to move relative to the slide between a first position in which the locking means are withdrawn from the rack recesses and a second position in which the cam maintains the locking means engaged in the rack recesses, and means for shifting the cam between said second position and first position; the following features :

the slideway has in cross section substantially the shape of a C and defines a transverse portion and two branch portions which define an open side through which the slide extends;
   the rack means comprise two rack members respectively integral with the two branch portions;
   one of two elements consisting of said cam and said slide having two outer portions spaced apart transversely of said plane and the other of said two elements having an inner portion interposed between said two outer portions;
   the two locking means extending transversely of said plane and being engaged by said two outer portions and engaged by said inner portion and being engageable with the two racks;
   the two branch portions, the two racks and the two outer portions being substantially symmetrically arranged and disposed relative to said plane and the slide being substantially symmetrical relative to said plane.

2. A device as claimed in claim 1, wherein said open side faces upwardly.

3. A device as claimed in claim 2, wherein the racks have downwardly facing operative edges defining the rack recesses.

4. A device as claimed in claim 2, wherein the racks have upwardly facing operative edges defining the rack recesses.

5. A device as claimed in claim 2, wherein the branch portions have substantially vertical edge portions defining the racks.

6. A device as claimed in claim 2, wherein the branch portions have vertical edge portions to which the racks are fixed.

7. A device as claimed in claim 2, wherein the branch portions have inwardly extending horizontal flange portions under which the racks are attached.

8. A device as claimed in claim 2, comprising apertures respectively provided in the slide and in the cam, the locking means comprising fingers having middle portions guided in said apertures and end portions co-operating with the racks.

9. A device as claimed in claim 8, wherein the cam is operative in both of its directions of movement, in one direction for maintaining the fingers engaged with the racks and in the other direction for disengaging the fingers from the racks.

10. A device as claimed in claim 1, wherein the second structure comprises a pin, an upper portion of the slide being rotatably mounted on the pin and the cam being mounted to pivot relative to the slide, means defining apertures in the slide for guiding the locking means, the guide face means comprising a surface on the transverse portion of the slideway.

11. A device as claimed in claim 1, wherein the second structure comprises a pin, an upper portion of the slide being rotatably mounted on the pin and the cam being mounted to pivot relative to the slide, means defining apertures in the slide for guiding the locking means, the guide face means comprising two bearing faces on upper edge portions of the branch portions of the slideway.

12. A device as claimed in claim 1, wherein the second structure comprises a pin, an upper portion of the slide being rotatably mounted on the pin and the cam being mounted to pivot relative to the slide, means defining apertures in the slide for guiding the locking means, the guide face means comprising bearing faces on the two racks.

13. A device as claimed in claim 9, wherein the cam has said two outer portions and the slide has said inner portion.

14. A device as claimed in claim 9, wherein the slide has said two outer portions and the cam has said inner portion.

15. A device as claimed in claim 1, wherein the second structure comprises a fork having two branches between which branches the slide is mounted.

16. A device as claimed in claim 15, wherein the branches of the fork have end portions within which end portions the branch portions of the slideway are disposed whereby the end portions of the branches of the fork are capable of precluding separation of the branch portions of the slideway.

* * * * *